(12) United States Patent
Alvarez et al.

(10) Patent No.: US 6,557,347 B1
(45) Date of Patent: May 6, 2003

(54) METHODS AND APPARATUS FOR CONTROLLING PEAK FIRING PRESSURE FOR TURBO-CHARGED DIESEL ENGINES

(75) Inventors: Juan Carlos Alvarez, Niskayuna, NY (US); Manoj Gokhale, Bangalore (IN)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 10/284,595

(22) Filed: Oct. 31, 2002

(51) Int. Cl.[7] .................................. F02B 33/44
(52) U.S. Cl. ........................ 60/611; 60/601; 60/608
(58) Field of Search ................... 60/611, 608, 601, 60/602; 123/198 F, 380

(56) References Cited

U.S. PATENT DOCUMENTS

| 4,425,761 | A | * | 1/1984 | Annus ......................... 60/611 |
| 4,459,809 | A | * | 7/1984 | Tadokoro et al. ............. 60/611 |
| 5,074,115 | A | | 12/1991 | Kawamura |
| 5,088,286 | A | | 2/1992 | Muraji |
| 5,261,236 | A | | 11/1993 | Ironside et al. |
| 5,406,797 | A | | 4/1995 | Kawamura |
| 5,526,645 | A | | 6/1996 | Kaiser |
| 5,560,208 | A | | 10/1996 | Halimi et al. |
| 5,605,045 | A | | 2/1997 | Halimi et al. |
| 5,778,674 | A | | 7/1998 | Kimura |
| 5,819,538 | A | | 10/1998 | Lawson, Jr. |
| 5,906,098 | A | * | 5/1999 | Woollenweber et al. ....... 60/608 |
| 6,158,416 | A | * | 12/2000 | Chen et al. .................. 123/380 |
| 6,256,993 | B1 | | 7/2001 | Halimi et al. |
| 6,286,480 | B1 | * | 9/2001 | Chen et al. .................. 123/380 |
| 6,295,816 | B1 | | 10/2001 | Gallagher et al. |

* cited by examiner

*Primary Examiner*—Sheldon J. Richter
(74) *Attorney, Agent, or Firm*—Armstrong Teasdale LLP; Robert B. Reeser, III

(57) ABSTRACT

A method and apparatus of operating a turbo-charged diesel locomotive engine to facilitate controlling pressure in an engine cylinder is provided. The method includes determining an allowable peak firing pressure for the turbo-charged diesel engine, determining an actual peak firing pressure, and comparing the allowable peak firing pressure to actual peak firing pressure to control the operation of the turbocharger for controlling peak firing pressure. The apparatus includes a diesel engine including an intake manifold, an exhaust manifold, an electronic fuel controller, a turbocharger, and a motor-generator coupled to the turbocharger and operable to at least one of increase turbocharger rotational speed, decrease turbocharger rotational speed, and maintain turbocharger rotational speed, and a controller including a first input corresponding intake manifold air pressure and a second input corresponding to fuel injection timing for the engine and including as an output a motor-generator configuration signal.

25 Claims, 4 Drawing Sheets

METHODS AND APPARATUS FOR CONTROLLING PEAK FIRING PRESSURE FOR TURBO-CHARGED DIESEL ENGINES

BACKGROUND OF THE INVENTION

The present invention relates generally to the field of rail locomotives, and more particularly to methods and apparatus for controlling a turbo-charged diesel locomotive engine.

Excessively high pressure in an operating cylinder of an internal combustion engine may cause damage to the engine pistons, cylinder heads, and other components. Peak firing pressure (PFP) is affected by the combustion process and the conditions of the incoming combustion air. In addition, the operation of a turbo-charger increases peak firing pressure by increasing the temperature and pressure of the incoming air.

Locomotives encounter a variety of operational conditions ranging from extreme cold at sea level to hot temperatures at high altitudes. These conditions may induce various engine parameters to exceed designed engine limits, for example, peak firing pressure (PFP), turbocharger speed (TS), and preturbine temperature (PTT). More specifically, the parameters are more susceptible to being exceeded when the engine is running at full load at extreme ambient temperature and/or altitude conditions.

There is also a continued demand for improved performance of locomotive engines, in terms of fuel economy, component loading, power output and reduced emissions. To facilitate optimized engine performance, conditions of combustion within the internal combustion engine should be controlled. However, engine designs are limited because of the extremes of environmental conditions under which a locomotive must operate. For example, cylinder PFP may become too high when an engine is operating during cold days and when the inlet air temperature is low, thus generating excessive stress on engine components. Alternatively, cylinder exhaust temperatures may become too high when the engine is operated during hot days and when the inlet air temperature is very high, thus causing turbocharger damage due to overheating and overspeed.

To facilitate controlling PFP, TS and PTT the engine may be operated with a power derate such that the engine is operated at lower than rated horsepower. However, derated engine operation is undesirable because it unnecessarily limits the operational capability of the locomotive.

BRIEF DESCRIPTION OF THE INVENTION

In one aspect, a method of operating a turbo-charged diesel locomotive engine to facilitate controlling pressure in an engine cylinder is described. The method includes determining an allowable peak firing pressure for the turbo-charged diesel engine, determining an actual peak firing pressure, and comparing the allowable peak firing pressure to actual peak firing pressure to control operation of the turbocharger for controlling peak firing pressure.

In another aspect, a method of operating a turbo-charged diesel locomotive engine to facilitate preventing damage from turbocharger failure is described. The method includes determining an allowable turbine speed for the turbocharger, determining an actual turbine speed, and comparing the allowable turbine speed to actual turbine speed to control operation of the turbocharger for controlling turbocharger speed.

In yet another aspect, a method of operating a turbo-charged diesel locomotive engine is described. The engine includes a turbo-charger for providing compressed air to an intake manifold of the engine, a motor-generator coupled to the turbocharger shaft, and an electronic controller receiving inputs from engine components. The method includes determining at least one of an allowable peak firing pressure for an engine cylinder, an allowable turbine speed for the turbocharger, an allowable preturbine temperature, an actual peak firing pressure as a function of at least one of an intake manifold air pressure, a manifold air temperature, and a timing of fuel injection into the cylinder, an actual turbine speed, and an actual preturbine temperature, using the electronic controller to compare at least one of the allowable peak firing pressure to the actual peak firing pressure, the allowable turbine speed to actual turbine speed, and the allowable preturbine temperature to the actual preturbine temperature, using the electronic controller to control the motor-generator, and operating the motor-generator to at least one of increase power input to the turbocharger shaft to increase the turbocharger rotational speed, decrease power input to the turbocharger shaft to decrease the turbocharger rotational speed, and maintain turbocharger rotational speed.

In still another aspect, a locomotive power unit is described. The power unit includes a diesel engine including an intake manifold for receiving compressed air, an exhaust manifold for removing exhaust, and an electronic fuel controller receiving inputs from engine components, a turbocharger including a turbine section connected to the exhaust manifold and a compressor section including an outlet connected to the intake manifold, the turbo-charger operable to provide compressed air to the intake manifold at an intake manifold air pressure, a motor-generator coupled to the turbocharger and operable to at least one of increase turbocharger rotational speed, decrease turbocharger rotational speed, and maintain turbocharger rotational speed; and a controller including a first input corresponding intake manifold air pressure and a second input corresponding to fuel injection timing for the engine and including as an output a motor-generator configuration signal, the output being responsive to the first input and the second input; and the motor generator being responsive to motor-generator configuration signal.

DETAILED DESCRIPTION OF THE INVENTION

Figure 1:
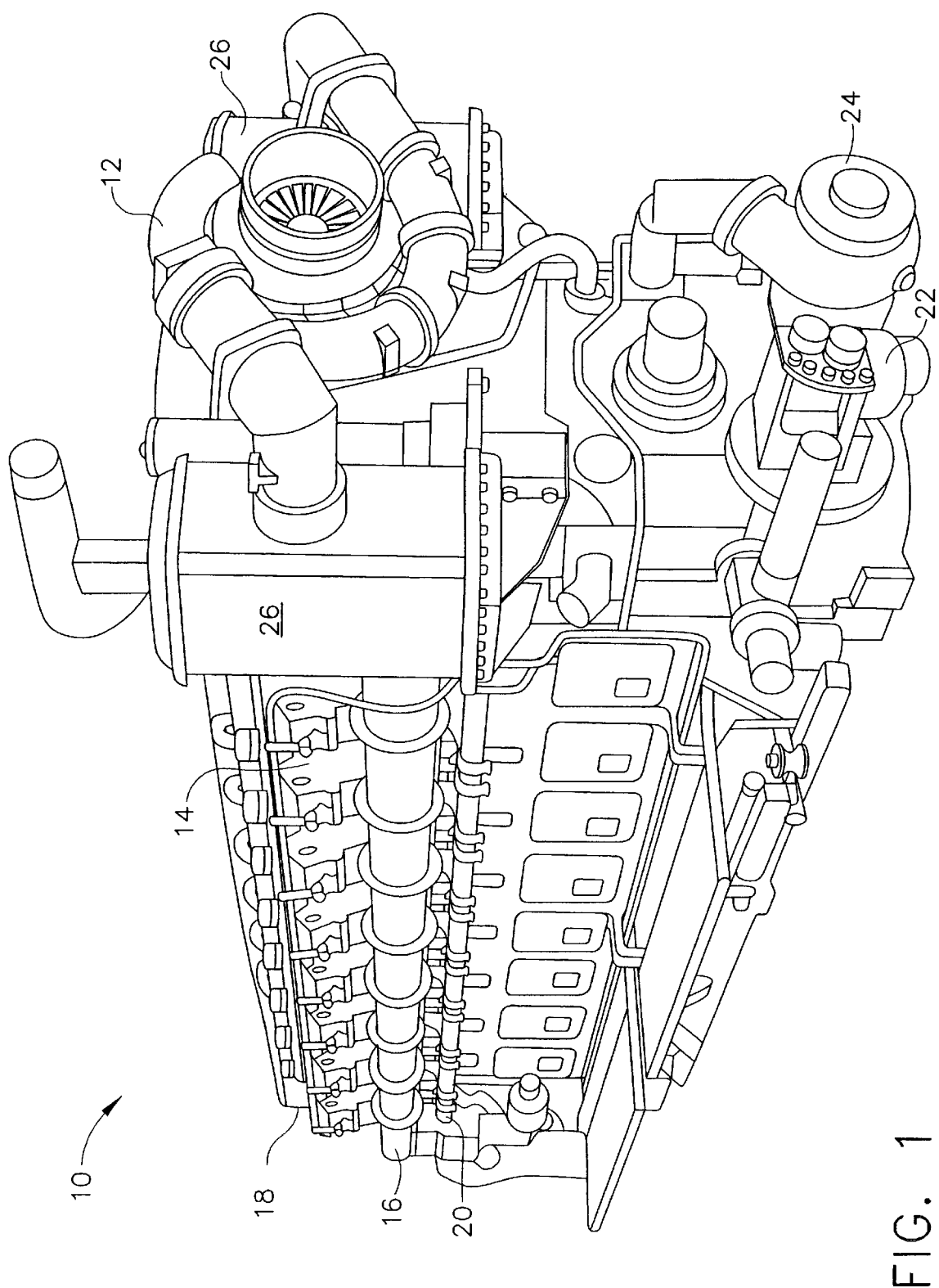
FIG. 1 is a front-side isometric view of a compression ignition diesel engine.

FIG. 1 is a front-side isometric view of a compression ignition diesel engine 10 and-includes a turbo charger 12 and a plurality of power cylinders 14. For example, a twelve-cylinder engine 10 has twelve power cylinders 14 while a sixteen-cylinder engine 10 has sixteen power cylinders 14. Engine 10 also includes an air intake manifold 16, a fuel supply line 18 for supplying fuel to each power cylinder 14, a water inlet manifold 20 used in cooling engine 10, a lube oil pump 22 and a water pump 24. An intercooler 26 connected to turbo charger 12 facilitates cooling turbo-charged air before it enters respective power cylinder 14. In an alternative embodiment, engine 10 is a V-type engine, wherein power cylinders 14 are arranged in an offset angle from adjacent power cylinders 14.

Figure 2:
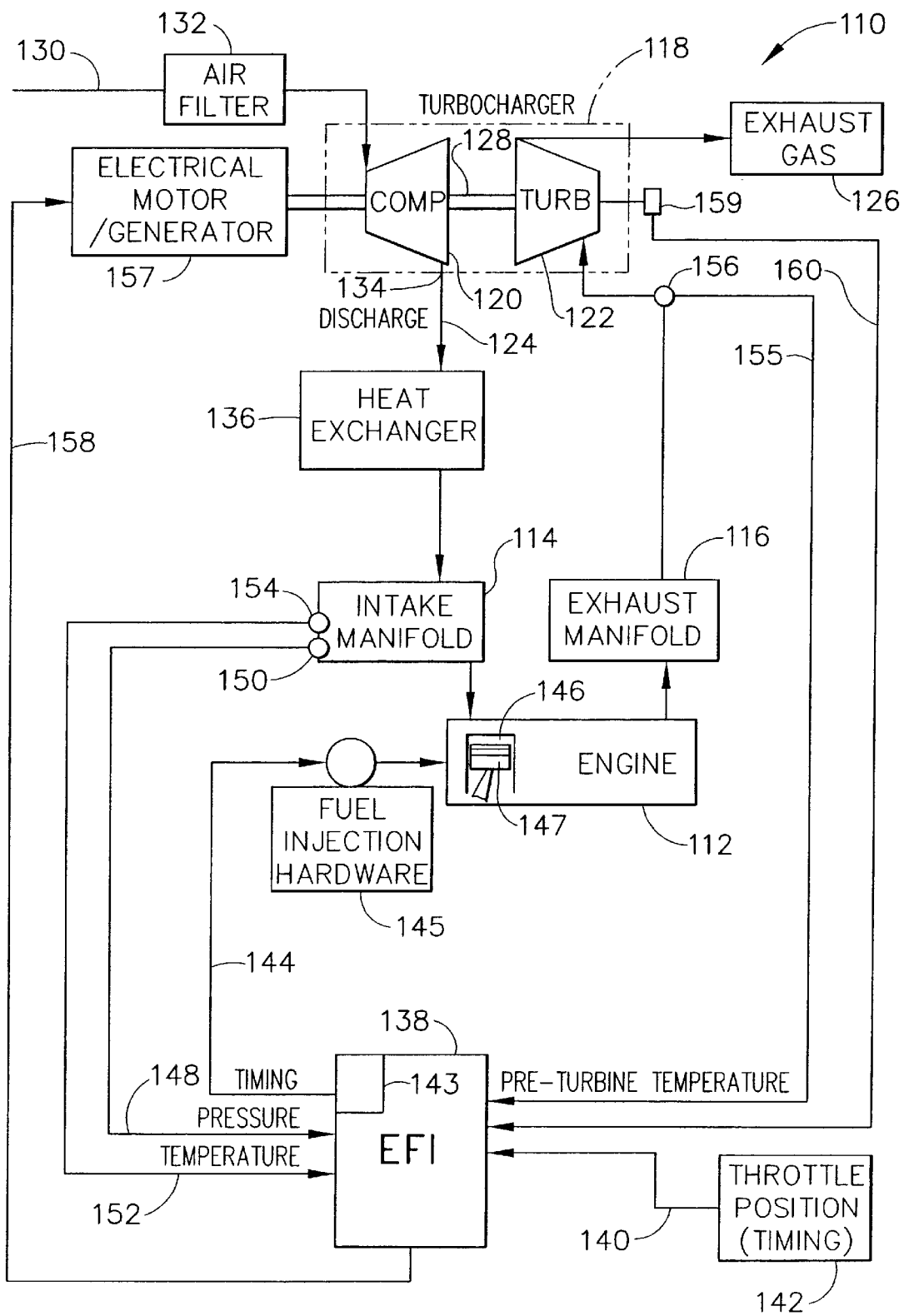
FIG. 2 is a schematic illustration of a locomotive power unit.

FIG. 2 is a schematic illustration of a locomotive power unit 110. Power unit 110 includes a diesel engine 112 including an intake manifold 114 and an exhaust manifold 116. A turbo-charger 118 including a compressor section 120 and a turbine section 122 is operable to provide a supply of compressed air 124 to intake manifold 114 for combustion within engine 112. Turbine section 122 is connected to exhaust manifold 116 for extracting energy from exhaust gases 126 for rotating a turbocharger shaft 128 that is connected to compressor section 120. Compressor section 120 draws ambient air 130 through a filter 132 and provides compressed air 124 through an outlet 134 connected to a heat exchanger 136, and then to intake manifold 114. Compressed air 124 is heated to an elevated temperature by compression, and is passed through heat exchanger 136 such that the temperature of air 124 is reduced prior to delivery into engine 112. In an exemplary embodiment, heat exchanger 136 is an air-to-water heat exchanger which utilizes engine coolant to facilitate removing heat from compressed air 124. In an alternative embodiment, heat exchanger 136 is an air-to-air heat exchanger which utilizes ambient air to facilitate removing heat from compressed air 124.

Power unit 110 also includes a controller 138. In the exemplary embodiment, controller 138 is an electronic fuel injection controller for engine 112. In an alternative embodiment, controller 138 is an electronic logic controller that is programmable by a user. Controller 138 receives a throttle setting signal 140 from an operator controlled throttle 142, and includes circuitry 143 operable to produce timing signal 144 for controlling the operation of fuel injector 145 for injecting fuel into a plurality of cylinders 146 of engine 112. A piston 147 is slidingly disposed in each cylinder 146 and reciprocates between a top dead center position and a bottom dead center position. Controller 138 also receives an intake manifold air pressure signal 148 generated by a pressure transducer 150, an intake manifold air temperature signal 152 generated by a temperature sensor 154, and a preturbine temperature signal 155 generated by a temperature sensor 156.

Power unit 110 also includes an electric motor-generator (MG) 157 for facilitating controlling the peak pressure in cylinder 146 of engine 112. MG 157 is mechanically coupled to turbocharger shaft 128 and receives an electrical control signal 158 from controller 138. MG 157 is operable to supply power to shaft 128 or remove power from shaft 128. When MG 157 is operated as a motor, power is supplied to turbocharger shaft 128, in addition to power supplied from turbine section 122, which increases turbocharger 118 speed and forces additional air into cylinders 146. Conversely, when MG 157 is operated as a generator, MG 157 is an additional load induced to turbocharger 118, which decreases turbocharger 118 speed and reduces the amount of combustion air entering into cylinders 146. By reducing the amount of compressed air 124 being provided to engine 112, MG 157 functions to reduce intake manifold air pressure, and to therefore reduce the peak pressure in cylinder 146. In addition, the heat demand on heat exchanger 136 is also reduced when MG 157 is operating in a generator configuration. The operational configuration of MG 157 is controlled by controller 138. A turbocharger speed sensor 159 is responsive to a speed of turbocharger 118 and sends a turbocharger speed signal 160 to controller 138.

Figure 3:
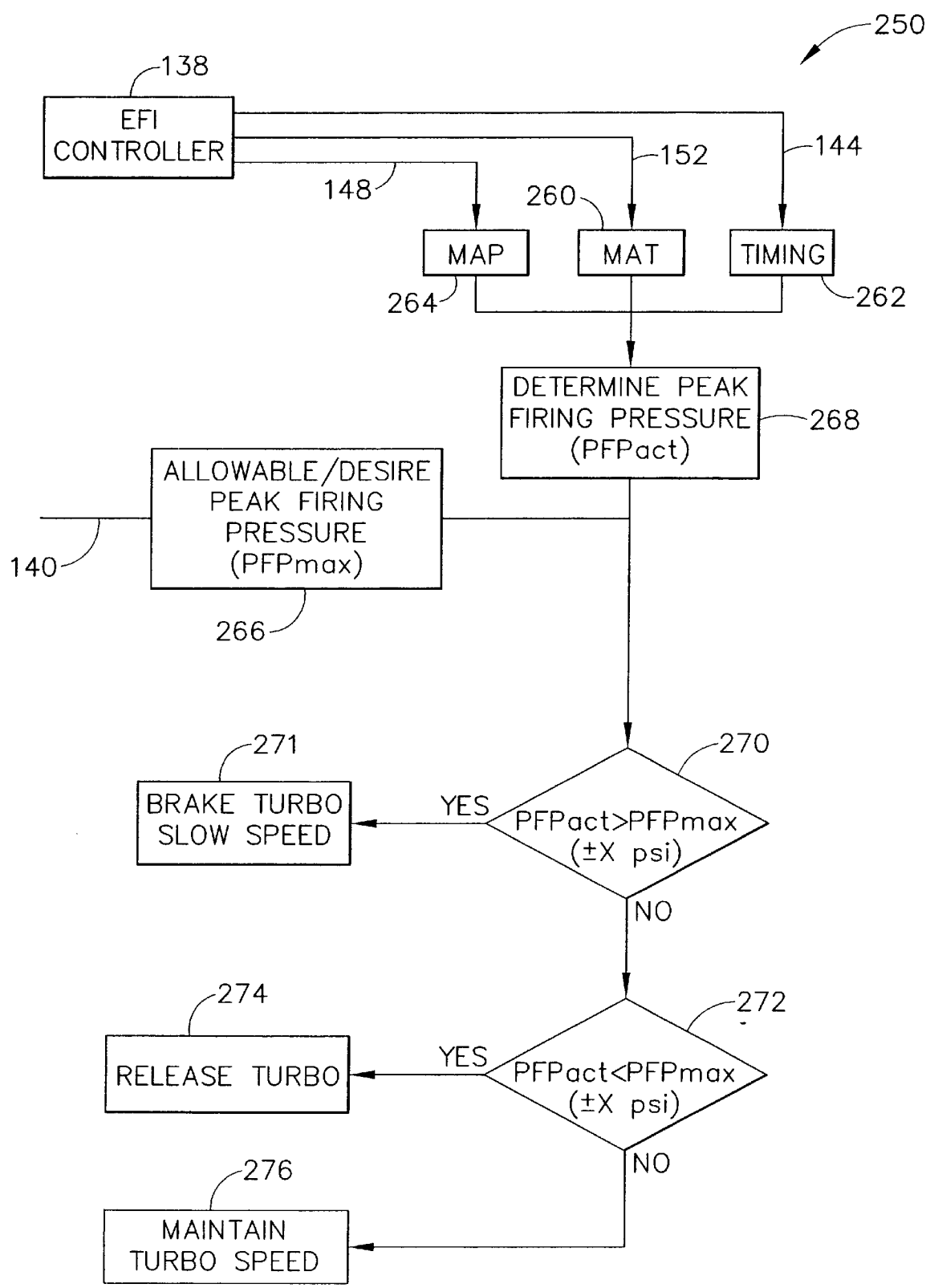
FIG. 3 is a schematic diagram of peak firing pressure logic.

FIG. 3 is a schematic diagram of peak firing pressure logic 250 that may be embodied within controller 138 as hardware, software, or firmware for controlling PFP. Controller 138 receives inputs MAP 148, MAT 152 and timing signal 144 that is representative of the timing of the operation of fuel injectors 145. Each input's contribution to a rise in cylinder pressure is calculated, and an actual peak firing pressure is determined and compared to an allowable peak firing pressure. Based on the result of these calculations, controller 138 changes the operating configuration of MG 157.

A rise in pressure due to the compression effect of the piston moving upward in the cylinder, also called the polytropic pressure rise, can also be determined. The pressure rise is a function of MAT 152, and a relationship between MAT 152 and a rise in cylinder pressure is an engine-specific function that is determined through modeling and/or empirical techniques. The relationship between MAT 152 and a rise in cylinder pressure is programmed into controller 138 such that the polytropic pressure rise in cylinder 146 over the intake air manifold pressure is determined 260 as a function of MAT 152.

A pressure rise in cylinder 146 over the polytropic pressure rise that results from combustion of fuel in cylinder 146 is also calculated or measured. This pressure rise is a function of a timing of fuel injection into cylinder 146. This relationship is also programmed into controller 138 so that the combustion pressure rise is calculated 262 as a function of timing.

The actual intake manifold air pressure also has an effect on the rise in pressure in cylinder 146. MAP signal 148 is input 264 and is the base from which the polytropic rise in pressure contributions from MAT 152 and timing 144 are calculated.

An allowable peak firing pressure is determined for an engine design based upon design parameters of the engine. The allowable pressure is a fixed maximum value or is a target range providing a desired level of engine performance. Allowable peak firing pressure is determined 266 as a fixed value, or is calculated as a function of throttle setting signal 140, since in some applications the desired allowable pressure may vary during different engine operating conditions. In an alternative embodiment, the allowable peak firing pressure is a desired peak firing pressure, which may be the same or a different value from allowable peak firing pressure depending on for, example, operation needs of the engine.

An actual peak firing pressure is calculated 268 by combining the results of steps 260, 262 and 264. In an alternative embodiment, actual PFP is measured using a sensor in communication with cylinders 146.

The allowable PFP from step 266, and actual PFP from step 268 are compared 270. If the result of comparison 270 shows actual PFP to be greater in magnitude than allowable PFP, controller 138 sends 271 signal 158 to MG 157 to configure MG 157 as a generator to remove power from shaft 128 and reduce a speed of turbocharger 118. Reducing turbocharger 118 speed facilitates reducing MAP 148 and MAT 152. Such reductions in MAP 148 and MAT 152 are used in step 268 and a lower actual PFP is calculated. The lower actual PFP is again compared 270 to allowable PFP. Controller 138 is programmed to periodically repeat logic 250 to readjust the configuration of MG 157 in response to changes in throttle position 142, ambient air temperature, or pressure, or other interrelated variables. MG 157 is controlled to change its configuration in a single step, in incremental steps, or in a fully proportional manner, depending upon the system design requirements and the capabilities of MG 157. Logic 250 is repeated until actual PFP is not greater than allowable PFP wherein actual PFP is compared 272 to allowable PFP. If actual PFP is lesser in magnitude than allowable PFP, controller 138 sends 274 signal 158 to MG 157 to configure MG 157 to freewheel, meaning to allow turbine section 122 to control the speed of turbocharger 118. If controller 138 was already commanding MG 157 to freewheel, controller issues a signal 158 to MG 157 to configure MG 157 as a motor to add power to shaft 128 and increase the speed of turbocharger 118. The sequence continues until at step 270, actual PFP is determined to be not greater than allowable PFP and at step 272, actual PFP is determined to be not less than allowable PFP controller 138 commands 276 MG 157 to maintain the speed of turbocharger 118. The above sequence describes a closed loop control scheme that maintains actual PFP at the allowable PFP value over a wide range of operations of engine 10.

Figure 4:
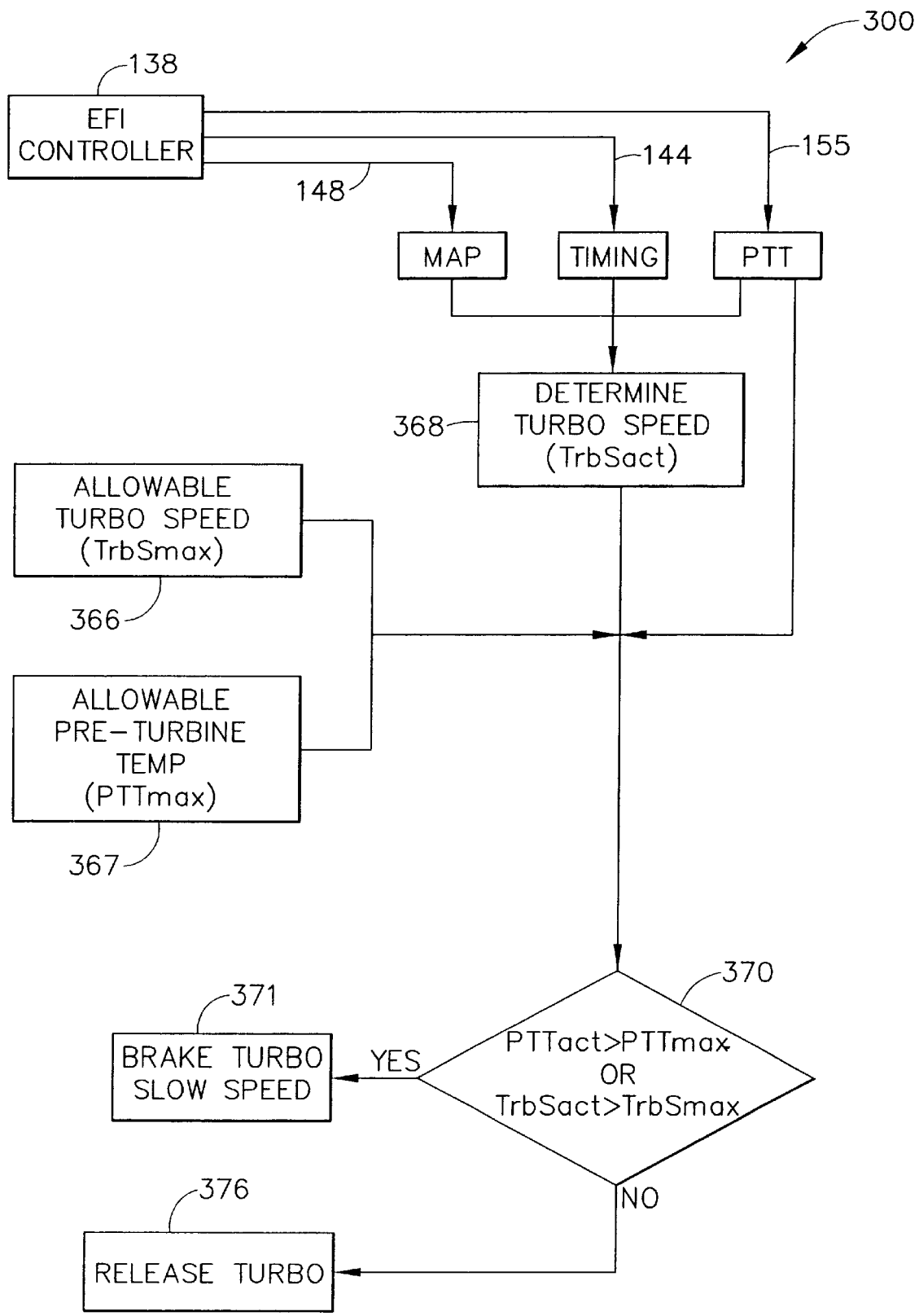
FIG. 4 is a schematic diagram of turbocharger turbine speed and preturbine temperature logic.

FIG. 4 is a schematic diagram that illustrates logic 300, which may be embodied within controller 138 as hardware, software, or firmware for controlling the speed of turbocharger 118 and for controlling preturbine temperature 155. Design limits of turbocharger 118 determine a maximum speed turbocharger 118 is allowed to rotate. Exceeding such limits may cause failure of a blade or other rotating components within turbocharger 118. PTT is limited to prevent exceeding a maximum allowable temperature of components located within turbocharger 118. Turbocharger 118 components are subjected to corrosive gases, high temperature, and intense stress due to rotational forces. Design limits on these parameters reduce a probability of failure of turbocharger 118.

Inputs MAP 148, timing 144, and PTT 155 are used determine 300 actual turbocharger speed. In an alternative embodiment, actual turbine speed is measured directly. An allowable turbocharger speed is determined 366, which may be a fixed value. In an alternative embodiment, allowable charger speed is determined 366 based on MAP 148, PTT 155, and other interrelated variables. For example, at lower PTT 155 temperature ranges, where a temperature stress on components in turbine section are less than at higher temperatures, it may be possible to extend the allowable turbine speed to higher values before total stress on the components of turbine section 122 become excessive. An allowable preturbine temperature is determined 367. Allowable preturbine temperature may also be a fixed value or may be determined 367 as a function of interrelated variables.

PTT 155 is compared 370 to allowable preturbine temperature as determined 367 and actual turbine speed as determined 368 is compared to allowable turbine speed as determined in step 366. If actual PTT 155 is greater than allowable PTT or actual turbine speed is greater than allowable turbine speed, controller 138 sends 371 signal 158 to MG 157 to configure MG 157 as a generator to remove power from shaft 128 and reduce a speed of turbocharger 118. If actual PTT 155 is not greater than allowable PTT and actual turbine speed is not greater than allowable turbine speed, controller 138 sends 376 signal 158 to MG 157 to configure MG 157 to freewheel and allow turbine section 122 alone to control a speed of turbocharger 118. Controller 138 is programmed to periodically repeat the steps of FIG. 4 to readjust the configuration of MG 157 in response to changes in throttle position 142, ambient air temperature, or pressure, or other interrelated variables.

In the exemplary embodiment, controller 138 is embodied within an existing electronic fuel injection controller of a locomotive. Such fuel injection controllers include logic and calculation capability, and may be embodied as a programmed logic controller, microprocessor, or personal computer. Electronic fuel injection controller 138 has inputs for intake manifold air pressure 148 and temperature signals 152, and for a throttle setting signal 140 and includes a fuel injection timing signal 144 as an output. Therefore, the additional logic necessary to produce a MG configuration signal 158 is included by additional programming of software or firmware within controller 138. MG configuration signal 158 may be programmed to be responsive to the intake manifold air pressure signal 148 and the timing signal 144. MG configuration signal 158 may further be programmed to be responsive to the intake manifold air temperature signal 152, and/or the throttle position signal 140. Controller 138 may be programmed to provide a default signal to freewheel MG 157 in the event of any system malfunction, such as a bad sensor or broken wire, etc.

While the present invention is described in the context of a locomotive, it is recognized that the benefits of the invention accrue to other applications of diesel engines. Therefore, this embodiment of the invention is intended solely for illustrative and exemplary purposes and is in no way intended to limit the scope of application of the invention.

The above-described diesel engine fuel injection systems are cost-effective and highly reliable. Each system includes an injector that injects fuel into a diesel engine combustion air volume such that a homogeneous fuel/air mixture results early in the engine cycle. Such injection facilitates complete burning of the fuel at lower temperatures resulting in less particulate emissions being formed and less NOx being generated. As a result, the fuel injection system facilitates reducing engine emissions in a cost-effective and reliable manner.

Exemplary embodiments of diesel engine fuel injection systems are described above in detail. The systems are not limited to the specific embodiments described herein, but rather, components of each system may be utilized independently and separately from other components described herein. Each diesel engine fuel injection systems component can also be used in combination with other diesel engine fuel injection systems components.

While the invention has been described in terms of various specific embodiments, those skilled in the art will recognize that the invention can be practiced with modification within the spirit and scope of the claims.

What is claimed is:

1. A method of operating a turbo-charged diesel locomotive engine to facilitate controlling pressure in an engine cylinder, said method comprising:

determining an allowable peak firing pressure for the turbo-charged diesel engine;

determining an actual peak firing pressure; and comparing the allowable peak firing pressure to actual peak firing pressure to control operation of the turbocharger for controlling peak firing pressure.

2. A method in accordance with claim 1 wherein determining an allowable peak firing pressure comprises using a throttle position input for determining an allowable peak firing pressure.

3. A method in accordance with claim 1 wherein determining an actual peak firing pressure comprises:

determining an intake manifold air pressure;

determining a first pressure rise in the cylinder over intake manifold air pressure as a function of a manifold air temperature;

determining a second pressure rise in the cylinder over the first pressure rise as a function of a timing of fuel injection into the cylinder;

determining an actual peak firing pressure as a function of the intake manifold air pressure, the first pressure rise, and the second pressure rise.

4. A method in accordance with claim 1 wherein determining an actual peak firing pressure comprises determining actual peak firing pressure using a sensor in flow communication with the cylinder.

5. A method in accordance with claim 1 wherein the engine includes a turbo-charger for providing compressed air to an intake manifold of the engine and when a motor-generator is coupled to the turbo-charger shaft, and wherein controlling the peak firing pressure further comprises at least one of:

operating the motor-generator to increase power input to the turbocharger shaft, increasing its rotational speed;

operating the motor-generator to decrease power input to the turbocharger shaft, decreasing its rotational speed; and operating the motor-generator to maintain turbocharger rotational speed.

6. A method in accordance with claim 1 wherein the engine includes an electronic controller, and wherein comparing the allowable peak firing pressure to actual peak firing pressure further comprises:

using an electronic controller to compare the allowable peak firing pressure to actual peak firing pressure; and controlling the motor-generator based on the comparison of the allowable peak firing pressure to actual peak firing pressure.

7. A method in accordance with claim 6 wherein the engine includes an electronic fuel injection controller, and wherein using an electronic controller further comprises using the electronic fuel injection controller to compare the allowable peak firing pressure to actual peak firing pressure.

8. A method of operating a turbo-charged diesel locomotive engine to facilitate preventing damage from turbocharger failure, said method comprising:

determining an allowable turbine speed for the turbocharger;

determining an actual turbine speed; and comparing the allowable turbine speed to actual turbine speed to control the operation of the turbocharger for controlling turbocharger speed.

9. A method in accordance with claim 8 wherein determining an actual turbine speed comprises determining an actual turbine speed as a function of at least one of an intake manifold air pressure, a fuel injection system timing and a preturbine temperature.

10. A method in accordance with claim 8 wherein determining an actual turbine speed comprises determining an actual turbine speed using a sensor responsive to turbocharger speed.

11. A method in accordance with claim 8 wherein the engine includes a turbo-charger for providing compressed air to an intake manifold of the engine and when a motor-generator is coupled to the turbo-charger shaft, and wherein controlling turbocharger speed further comprises:

operating the motor-generator to increase power input to the turbocharger shaft, increasing its rotational speed;

operating the motor-generator to decrease power input to the turbocharger shaft, decreasing its rotational speed;

operating the motor-generator to maintain turbocharger rotational speed.

12. A method in accordance with claim 8 wherein the engine includes an electronic controller, and wherein comparing the allowable peak firing pressure to actual peak firing pressure further comprises:

using an electronic controller to compare the allowable peak firing pressure to actual peak firing pressure; and controlling the motor-generator based on the comparison of the allowable peak firing pressure to actual peak firing pressure.

13. A method in accordance with claim 12 wherein the engine includes an electronic fuel injection controller, and wherein using an electronic controller further comprises using the electronic fuel injection controller to compare the allowable turbine speed to actual turbine speed.

14. A method in accordance with claim 8 further comprising:

determining an allowable preturbine temperature;

determining an actual preturbine temperature; and comparing the allowable preturbine temperature to the actual preturbine temperature to control the operation of the turbocharger for controlling turbocharger speed.

15. A method in accordance with claim 14 wherein determining an actual preturbine temperature comprises determining an actual preturbine temperature using a sensor responsive to preturbine temperature.

16. A method in accordance with claim 14 wherein the engine includes a turbo-charger for providing compressed air to an intake manifold of the engine and when a motor-generator is coupled to the turbo-charger shaft, and wherein controlling turbocharger speed further comprises:

operating the motor-generator to increase power input to the turbocharger shaft, increasing its rotational speed;

operating the motor-generator, decrease power input to the turbocharger shaft, decreasing its rotational speed; and operating the motor-generator to maintain turbocharger rotational speed.

17. A method in accordance with claim 14 wherein the engine includes an electronic controller, and wherein comparing the allowable preturbine temperature to actual preturbine temperature further comprises:

using an electronic controller to compare the allowable preturbine temperature to actual preturbine temperature; and controlling the motor-generator based on the comparison of the allowable preturbine temperature to actual preturbine temperature.

18. A method in accordance with claim 17 wherein the engine includes an electronic fuel injection controller, and wherein using an electronic controller further comprises using the electronic fuel injection controller to compare the allowable preturbine temperature to actual preturbine temperature.

19. A method of operating a turbo-charged diesel locomotive engine including a turbo-charger for providing compressed air to an intake manifold of the engine, a motor-generator coupled to the turbocharger shaft, and an electronic controller receiving inputs from engine components, said method comprising:

determining at least one of an allowable peak firing pressure for an engine cylinder, an allowable turbine speed for the turbocharger, an allowable preturbine temperature, an actual peak firing pressure as a function of at least one of an intake manifold air pressure, a manifold air temperature, and a timing of fuel injection into the cylinder, an actual turbine speed, and an actual preturbine temperature;

using the electronic controller to compare at least one of the allowable peak firing pressure to the actual peak firing pressure, the allowable turbine speed to actual turbine speed, and the allowable preturbine temperature to the actual preturbine temperature;

using the electronic controller to control the motor-generator; and operating the motor-generator to at least one of increase power input to the turbocharger shaft to increase the turbocharger rotational speed, decrease power input to the turbocharger shaft to decrease the turbocharger rotational speed, and maintain turbocharger rotational speed.

20. A method in accordance with claim 19 wherein determining an actual peak firing pressure comprises determining actual peak firing pressure using a sensor in flow communication with the cylinder.

21. A method in accordance with claim 19 wherein the engine includes an electronic fuel injection controller, and wherein using an electronic controller further comprises using the electronic fuel injection controller.

22. A locomotive power unit comprising:

a diesel engine comprising an intake manifold for receiving compressed air, an exhaust manifold for removing exhaust, and an electronic fuel controller receiving inputs from engine components;

a turbo-charger comprising a turbine section connected to said exhaust manifold and a compressor section comprising an outlet connected to said intake manifold, said turbo-charger operable to provide compressed air to said intake manifold at an intake manifold air pressure;

a motor-generator coupled to said turbocharger and operable to at least one of increase turbocharger rotational speed, decrease turbocharger rotational speed, and maintain turbocharger rotational speed; and a controller including a first input corresponding intake manifold air pressure and a second input corresponding to fuel injection timing for said engine and including as an output a motor-generator configuration signal, said output being responsive to said first input and said second input; and said motor generator being responsive to motor-generator configuration signal.

23. The power unit of claim 22 wherein said controller is said engine electronic fuel controller.

24. The power unit of claim 22, further comprising:

said controller including a third input corresponding to an intake manifold air temperature; and said output being responsive to said first input, said second input, and said third input.

25. The power unit of claim 24, further comprising:

said controller including a four input corresponding to a preturbine temperature, and a fifth input corresponding to a throttle position; and said output being responsive to said first input, said second input, said third input, said fourth input, and said fifth input.

* * * * *